(12) United States Patent
Macbeth et al.

(10) Patent No.: US 10,810,649 B2
(45) Date of Patent: *Oct. 20, 2020

(54) USER TASK COMPLETION VIA OPEN MARKET OF ACTIONS AND/OR PROVIDERS

(71) Applicant: Microsoft Technology Licensing, LLC, Redmond, WA (US)

(72) Inventors: Steven William Macbeth, Redmond, WA (US); Michael William O'Connor, Snoqualmie, WA (US); Zhaowei Charlie Jiang, Palo Alto, CA (US); Michael Van Snellenberg, Seattle, WA (US); Li Jiang, Bellevue, WA (US); Shajib Sadhukha, Seattle, WA (US); Amit Kumar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/801,156

(22) Filed: Nov. 1, 2017

(65) Prior Publication Data
US 2018/0068372 A1    Mar. 8, 2018

Related U.S. Application Data

(63) Continuation of application No. 13/441,898, filed on Apr. 8, 2012, now Pat. No. 9,811,850.

(51) Int. Cl.
*G06F 16/00* (2019.01)
*G06Q 30/06* (2012.01)
(Continued)

(52) U.S. Cl.
CPC ....... *G06Q 30/0631* (2013.01); *G06F 16/951* (2019.01); *G06F 16/9535* (2019.01);
(Continued)

(58) Field of Classification Search
CPC ............... G06F 16/9535; G06F 16/951; G06F 16/9038; G06Q 30/0631; G06Q 30/0256; G06Q 30/0627; G06Q 50/10
(Continued)

(56) References Cited

U.S. PATENT DOCUMENTS

| 7,194,454 B2 | 3/2007 | Hansen et al. |
| 7,209,915 B1 | 4/2007 | Taboada |

(Continued)

FOREIGN PATENT DOCUMENTS

| CN | 102609444 | 7/2012 |
| EP | 1580666 | 1/2007 |

OTHER PUBLICATIONS

Sadikov et al., "Clustering Query Refinements by User Intent", WWW 2010, Apr. 26-30, pp. 841-850.*
(Continued)

*Primary Examiner* — Monica M Pyo

(57) ABSTRACT

Among other things, one or more techniques and/or systems are provided for facilitating the completion of a user task. That is, user intent (e.g., intentions of a user to perform a user task) may be identified. The user intent may comprise an entity (e.g., a movie entity) and/or an action (e.g., an order movie tickets action) that the user wants to perform on the entity. A provider list may be created based upon one or more providers capable of performing the action on the entity (e.g., a movie application may be capable of performing the order movie tickets action on the movie entity). Providers may be dynamically selected for inclusion within the provider list at run-time. For example, an open market of providers may be maintained (e.g., providers may be added, removed, and/or updated over time), such that providers may be selected from the open market to complete user tasks.

19 Claims, 10 Drawing Sheets

(51) Int. Cl.
G06F 16/951 (2019.01)
G06F 16/9535 (2019.01)
G06Q 30/02 (2012.01)
G06Q 50/10 (2012.01)
G06F 16/9038 (2019.01)

(52) U.S. Cl.
CPC ..... *G06Q 30/0256* (2013.01); *G06Q 30/0627* (2013.01); *G06Q 50/10* (2013.01); *G06F 16/9038* (2019.01)

(58) Field of Classification Search
USPC .................................................. 707/708, 709
See application file for complete search history.

(56) References Cited

U.S. PATENT DOCUMENTS

| | | |
|---|---|---|
| 7,460,610 B2 | 12/2008 | Matsumoto |
| 7,831,585 B2 | 11/2010 | Ramsey et al. |
| 7,877,280 B2 | 1/2011 | Jones |
| 8,027,964 B2 | 9/2011 | Boulis |
| 8,060,520 B2 | 11/2011 | Koran |
| 8,117,208 B2 | 2/2012 | Chang et al. |
| 9,811,850 B2 | 11/2017 | Macbeth et al. |
| 2005/0050057 A1 | 3/2005 | Mital et al. |
| 2006/0064411 A1* | 3/2006 | Gross ............... G06F 16/90324 |
| 2007/0011034 A1* | 1/2007 | Jones .................... G06Q 10/02 705/6 |
| 2007/0130121 A1 | 6/2007 | Dolph |
| 2007/0130124 A1 | 6/2007 | Ramsey et al. |
| 2007/0185844 A1 | 8/2007 | Schachter |
| 2007/0201232 A1 | 8/2007 | Chen |
| 2007/0204232 A1 | 8/2007 | Ray et al. |
| 2007/0300174 A1 | 12/2007 | Macbeth et al. |
| 2008/0005069 A1 | 1/2008 | Payne et al. |
| 2010/0082398 A1 | 4/2010 | Davis et al. |
| 2011/0035402 A1 | 2/2011 | Agrawal et al. |
| 2011/0040644 A1 | 2/2011 | Juda et al. |
| 2011/0208822 A1* | 8/2011 | Rathod ............... G06F 16/9535 709/206 |
| 2011/0225293 A1* | 9/2011 | Rathod ................. G06Q 10/00 709/224 |
| 2012/0016678 A1 | 1/2012 | Gruber et al. |
| 2012/0030227 A1 | 2/2012 | Mital et al. |
| 2012/0117058 A1 | 5/2012 | Rubinstein |
| 2012/0144452 A1 | 6/2012 | Dyor |
| 2012/0226995 A1 | 9/2012 | Kimchi |

OTHER PUBLICATIONS

Zha et al., "Visual query suggestion: Towards capturing user intent in internet image search", http://www.researchgate.net/publication/220214451, Jan. 2010, 20 pages.*
Yin et al., "Building Taxonomy of Web Search Intents for Name Entity Queries", WWW 2010, Apr. 26-30, 2010, 10 pages.*
Bautin et al., "Concordance-Based Entity-Oriented Search", http://bautin.org/pdf/entity_oriented_search.pdf, Feb. 22, 2012, 7 pages.
Chinese Office Action in Application 201380018744.X, dated Dec. 26, 2016, 10 pages.
Chinese Office Action in Application 201380018744.X, dated Sep. 1, 2017, 7 pages.
Chinese Office Action in Application 2013800187744.X, dated Jan. 31, 2018, 6 pages.
Chong, "Preview of S+S Application Marketplace Architecture Guidance" Mar. 2008, 13 pages.
Datha et al., "Custom Local Search", http://research.microsoft.com, Nov. 9, 2009, 12 pages.
European Search Report in Application 13726901.5, dated Oct. 6, 2015, 5 pages.
Ioannou et al., "Entity Search with Necessity", http://lsirpeople.epfl.cn/sathe/papers/webdb-demo.pdf, Proceedings: Twelfth International Workshop on the Web and Databases (WebDB 2009) Jun. 2009, pp. 44-45.
PCT International Preliminary Report on Patentability in PCT/US2013/035351, dated Oct. 14, 2014, 10 pages.
PCT International Search Report in PCT/US2013/035351, dated Jul. 24, 2014, 10 pages.
U.S. Appl. No. 13/441,898, 312 amendment filed Sep. 14, 2017, 7 pages.
U.S. Appl. No. 13/441,898, Amendment and Response filed Sep. 22, 2014, 15 pages.
U.S. Appl. No. 13/441,898, Amendment and Response filed Jun. 14, 2015, 16 pages.
U.S. Appl. No. 13/441,898, Amendment and Response filed Nov. 23, 2015, 13 pages.
U.S. Appl. No. 13/441,898, Amendment and Response filed Jul. 8, 2016, 12 pages.
U.S. Appl. No. 13/441,898, Amendment and Response filed Nov. 11, 2016, 14 pages.
U.S. Appl. No. 13/441,898, Amendment and Response filed May 10, 2017, 14 pages.
U.S. Appl. No. 13/441,898, Notice of Allowance dated Jun. 21, 2017, 13 pages.
U.S. Appl. No. 13/441,898, Office Action dated Mar. 21, 2014, 12 pages.
U.S. Appl. No. 13/441,898, Office Action dated Jan. 14, 2015, 14 pages.
U.S. Appl. No. 13/441,898, Office Action dated Aug. 21, 2015, 15 pages.
U.S. Appl. No. 13/441,898, Office Action dated Mar. 8, 2016, 12 pages.
U.S. Appl. No. 13/441,898, Office Action dated Aug. 11, 2016, 11 pages.
U.S. Appl. No. 13/441,898, Office Action dated Mar. 10, 2017, 12 pages.
U.S. Appl. No. 13/441,898, response to 312 amendment dated Sep. 21, 2017, 2 pages.
Waitelonis et al., "The Path is the Destination—Enabling a New Search Paradigm with Linked Data" http://linkeddata.future-internet.eu/images/c/c5/FIA2010_The_Path_Is_The_Destination_-Enabling_a_New_Search_paradigm_with_linked_data.pdf, In Proc. Of the Workshop on Linked Data in the Future Internet at the Future Internet Assembly, Dec. 2012, 8 pages.
Enabling_a_New_Search_paradigm_with_linked_data.pdf, In Proc. Of the Workshop on Linked Data in the Future Internet at the Future Internet Assembly, Dec. 2012, 8 pages.
"Notification of Reexamination Issued in Chinese Patent Application No. 201380018744.X", dated Dec. 3, 2018, 9 Pages.
"Office Action Issued in European Patent Application No. 13726901.5", dated Mar. 15, 2019, 8 Pages.
"Summons to Attend Oral Proceedings Issued in European Patent Application No. 13726901.5", dated Apr. 17, 2020, 10 Pages.

* cited by examiner

USER TASK COMPLETION VIA OPEN MARKET OF ACTIONS AND/OR PROVIDERS

CROSS-REFERENCE TO RELATED APPLICATIONS

This application is a continuation application and claims priority to U.S. patent application Ser. No. 13/441,898, filed Apr. 8, 2012, entitled "USER TASK COMPLETION VIA OPEN MARKET OF ACTIONS AND/OR PROVIDERS," now issued U.S. Pat. No. 9,811,850, which application is incorporated herein by reference in its entirety.

BACKGROUND

Today, computing devices (e.g., tablet devices, personal computers, smart phones, etc.) allow users to perform a wide variety of user tasks. Completion of a user task generally involves a sequence of manual actions performed by the user (e.g., an initial search, an exploration of relevant entities identified within search results, submission of user task information to an entity, submission of entities involved in a user task to a provider, and/or other various actions). In one example, a user may desire to buy tickets for a new movie. The user may submit a search query through a search engine for the new movie. The search engine may return search results comprising one or more providers associated with the new movie, such as a movie review website, a movie theater website, a movie image web service, a movie preview web service, etc. The user may explore a particular provider, such as the movie theater website, to determine whether the movie theater website is capable of selling tickets for the new movie. The user may reenter information associated with the new movie and/or additional information that may be used by the movie theater website to sell the tickets for the new movie. In this way, the user may purchase the tickets for the new movie from the movie theater website.

SUMMARY

This Summary is provided to introduce one or more concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for facilitating completion of a user task are provided herein. It may be appreciated that in one example, a user task may comprise any task that a user may accomplish through a computing device (e.g., purchasing movie tickets through a movie application, viewing a movie rental through a movie rental streaming service, obtaining driving directions from a mapping website, obtaining a restaurant reservation using a restaurant web service, and/or a plethora of other tasks that may be accomplished through web services, web sites, user device commands, local applications, web applications, and/or other providers). The user task may relate to an entity (e.g., a movie entity, a restaurant entity, a hotel entity, and/or hundreds of thousands of entities corresponding to everyday things). The user task may relate to an action that is to be performed on the entity (e.g., a purchase ticket action for the movie entity, a stream video action for the movie entity, a download video file action for the movie entity, etc.). Accordingly, it may be advantageous to facilitate completion of the user task by one or more providers (e.g., through a set of actions and one or more providers) that may have the capability to perform the action on the entity. In this way, an open market of actions and/or providers may be established for the completion of various user tasks.

In one example, a user intent associated with a user task of a user may be identified (e.g., a user may submit a search query for a new movie). The user intent may comprise an entity and/or an action that is to be performed on the entity (e.g., the user intent may comprise a new movie entity and a purchase tickets action). A provider list comprising one or more providers (e.g., web services, websites, commands on a user device, a native application on the user device, a remote application, etc.) configured to perform the action on the entity may be created. It may be appreciated that in one example, the provider list may be dynamically created at run-time (e.g., as opposed to merely being hardcoded into a user interface, such as a search engine), which may allow for the provider list to change over time as providers become available and/or unavailable. For example, the provider list may be generated based upon evaluating a provider description data structure comprising one or more provider entries, where a provider entry defines a set of entities and/or a set of actions supported by a provider (e.g., the entity and the action associated with the user intent may be used to query the provider description data structure for one or more providers configured to perform the action on the entity). The provider list may be provided to the user to facilitate completion of the user task. For example, the user may be able to select a provider from the provider list to complete the user task. A context comprising the entity, the action, and/or personalization data may be sent to the selected provider so that the selected provider may efficiently complete the user task. For example, the context may comprise a description of the entity, a description of the action, and/or personalization data (e.g., a location, preference, history, social network data, login credentials, etc.).

In another example, a user intent associated with a user task of a user may be identified (e.g., the user may search for boats within a photo user interface). The user intent may comprise an entity (e.g., a boat entity). An action-provider list comprising one or more providers configured to perform one or more actions on the entity may be created in real-time. That is, the action-provider list may be dynamically created in real-time (e.g., as opposed to being statically hardcoded into the photo user interface) based upon the user intent and/or one or more available providers having capabilities of performing actions upon the entity (e.g., providers currently available and/or registered within a provider description data structure). The action-provider list may be provided to the user to facilitate completion of the user task. For example, the user may be able to select an action and/or a provider from the action-provider list to complete the user task. A context comprising the entity, the action and/or personalization data may be sent to the selected provider so that the selected provider may efficiently complete the user task. For example, the context may comprise a description of the entity, a description of the action, and/or personalization data (e.g., a location, preference, history, social network data, login credentials, etc.).

In another example, a provider description data structure comprising one or more provider entries may be maintained. The provider description data structure may comprise a dynamic repository of providers capable of perform actions upon entities (e.g., providers may register, unregister, update supported entities, and/or update supported actions). For example, a provider entry (e.g., a provider entry for a movie rental provider) may define a set of entities (e.g., a first action movie, a second action movie, a third action movie, a comedy movie, a thriller movie, etc.) and a set of actions (e.g., a stream action, an order movie disk to house action, a preview movie action, a create new account action, etc.) supported by a provider. The provider description data structure may be used to create an open market for providers, where provides may register, unregister, and/or modify registration with the provider description data structure (e.g., a new entry may be created for a new provider so that the new provider may be considered when provider lists and/or action-provider lists are created for completing user tasks). In this way, user tasks may be completed by providers registered with the provider description data structure.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
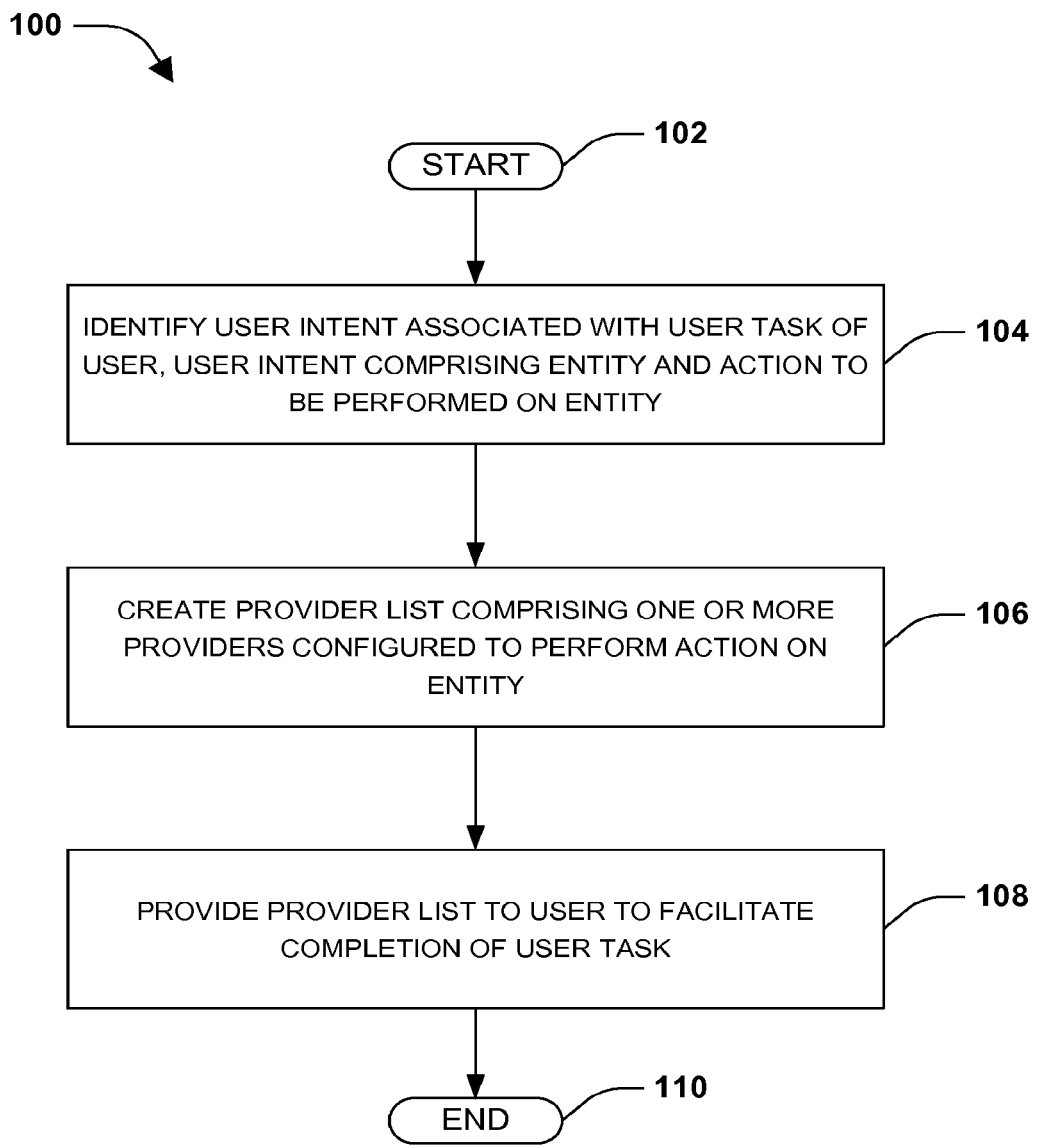
FIG. 1 is a flow diagram illustrating an exemplary method of facilitating completion of a user task.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Web services, local device applications, web pages, and/or a variety of provider user interfaces may allow a user to perform various user tasks (e.g., a user may reserve seats at a restaurant using a restaurant application on a smart phone). In one example, a user may initiate a user task by searching for an entity (e.g., a user may search for new movie release using a movie application on a tablet device). The user may navigate through search results in an attempt to discover a provider that may be capable of performing a desired action upon the entity (e.g., the user may explore a movie ticket ordering website returned within the search results). The user may provide detailed information to the provider regarding the user task (e.g., the user may reenter the search for new movies, select a new movie, and begin the ticket purchase process). It may be advantageous to create an open market for providers to register for completing user tasks (e.g., a provider may specify one or more entities and/or actions supported by the provider). In this way, one or more registered providers may be dynamically suggested to a user for the completion of a user task. Accordingly, one or more systems and/or techniques for facilitating the completion of a user task by providing a user with a provider list and/or an action-provider list identifying providers that may be capable of completing the user task are provided herein.

One embodiment of facilitating completion of a user task is illustrated by an exemplary method 100 in FIG. 1. At 102, the method starts. At 104, a user intent associated with a user task of a user may be identified (e.g., a user may express an interest in a new sports car through a web search engine or local application on a computing device). The user intent may comprise an entity (e.g., a new sports car entity) and/or an action that is to be performed on the entity (e.g., a purchase car action, a request a quote action, a read review action, a view images action, etc.). In one example of identifying the user intent, a context data structure comprising one or more entity entries may be queried to identify the entity and/or the action that is to be performed on the entity. For example, an entity entry may define the entity and one or more actions supported for the entity.

At 106, a provider list comprising one or more providers configured to perform the action on the entity may be created. A provider, for example, may correspond to a website, a web service, a command on a user device (e.g., a phone number dial command), a native application on the user device (e.g., a car shopping application), a remote application (e.g., a cloud-based application), etc. In one example of creating the provider list, a provider description data structure comprising one or more provider entries may be queried to identify a provider for inclusion within the provider list. For example, a provider entry may define a set of entities and/or a set of actions supported by the provider. A provider may be identified for inclusion within the provider list based upon a provider entry within the provider description data structure specifying that the provider supports the action and/or the entity associated with the user intent. In another example of creating the provider list, a personalization data structure comprising user provider preference data may be queried to identify a provider for inclusion within the provider list (e.g., the user may have previously purchased a car from a particular dealership, the user may have a membership with a sports car fan website, etc.).

One or more potential providers configured to perform the action on the entity (e.g., providers identified within the provider description data structure) may be dynamically ranked based upon various criteria. For example, potential providers may be ranked based upon provider popularity/notoriety (e.g., a car rental website may be known and/or trusted in the car rental business market), provider security features (e.g., a ticket purchasing application may provide above average credit card security), user experience feedback with providers (e.g., users may provide feedback that a movie streaming service provided poor quality movie streams), a level of service subscribed to by a provider (e.g., a provider may register with the provider description data structure and subscribe to a particular level of service), etc. In this way, one or more ranked potential providers may be selected for inclusion within the provider list as the one or more providers.

At 108, the provider list may be provided to the user to facilitate completion of the user task. It may be appreciated that in one example, the provider list may have been dynamically created and/or provided to the user at run-time (e.g., the selection of providers for inclusion within the provider list may be determined at run-time, and may not be based upon a static selection, for example). A user selection of a provider within the provider list may be received. A context comprising the entity, the action, and/or personalization data (e.g., a location, preference, history, social network data, login credentials, etc.) may be sent to the provider so that the provider may have information available to efficiently process the user task, while mitigating reentry of information by the user.

In one example, because provider lists may be dynamically created, varying sets of providers may be selected for inclusion within provider lists associated an entity and/or action based upon various factors, such as rankings, currently available/registered providers, user preferences, etc. In this way, a provider list for an entity/action may adapt over time (e.g., the provider list may not be a static hard-coded list). In one example of dynamic provider lists, a first user may attempt to rent a new movie. A user intent comprising a new movie entity and a rent movie action may be identified. A first provider list comprising a first movie rental company and a second movie rental company may be created. The first and second movie rental companies may be selected from a provider description data structure based upon rankings (e.g., the first and second movie rental companies may have positive user feedback) and/or user preference data (e.g., the user may have an account with the first rental company). Over-time, the provider description data structure may be updated (e.g., the second movie rental company may receive negative user feedback, the first movie rental company may unregister with the provider description data structure, a third movie rental company may newly register with the provider description data structure, etc.). It may be appreciated that the provider description data structure may be updated through various techniques, such as a web crawl to identify new providers, a developer may submit an application manifest describing capabilities (e.g., entities and/or actions) of a provider, local device application functionality may be identified (e.g., a new application capable of streaming movies may be installed on a local device), etc. Accordingly, a second user may attempt to rent the new movie. A second user intent comprising the new movie entity and the rent movie action may be identified. A second provider list comprising the third movie rental company may be created. The third movie rental company may be selected from the updated provider description data structure based upon rankings (e.g., the third movie rental company may have a higher ranking than the second movie rental company because of the negative feedback for the second movie rental company). In this way, provider lists may be dynamically created based upon various criteria. Similarly, should the first user attempt to rent the same movie at a different point in time, for example, the provider list presented to the first user at this different point in time may be different than the provider list presented to the first user when the first user initially attempted to rent the movie. At 110, the method ends.

Figure 2:
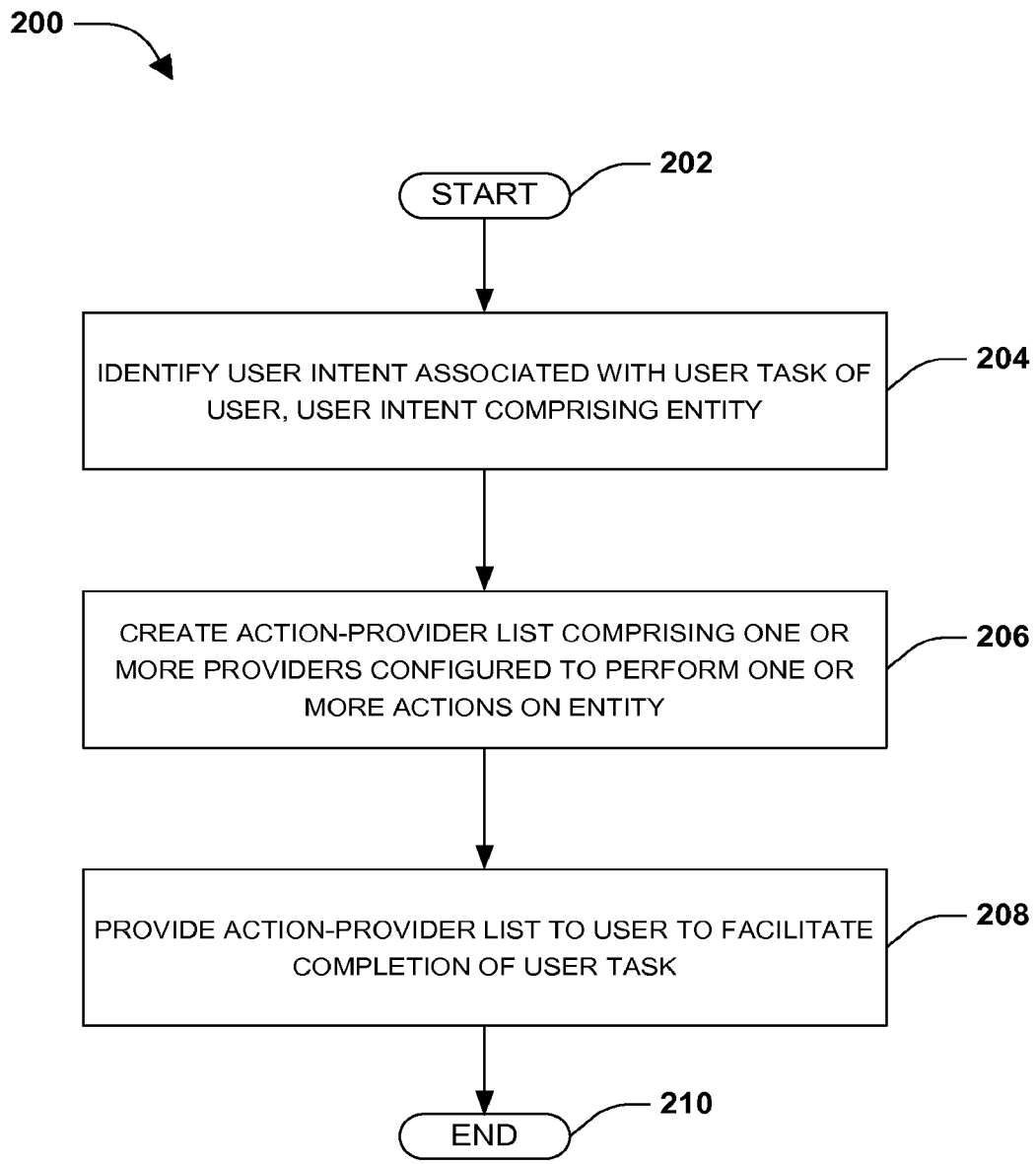
FIG. 2 is a flow diagram illustrating an exemplary method of facilitating completion of a user task.

One embodiment of facilitating completion of a user task is illustrated by an exemplary method 200 in FIG. 2. At 202, the method starts. At 204, a user intent associated with a user task of a user may be identified. The user intent may comprise an entity. For example, a user may input "pizza" into a personal assistant application on a smart phone, which may be identified as a pizza entity. At 206, an action-provider list comprising one or more providers configured to perform actions on the entity (e.g., the pizza entity) may be created in real-time. For example, a context data structure comprising one or more entity entries may be maintained. An entity entry may define the pizza entity and/or one or more actions supported for the pizza entity (e.g., an order pizza action, a request pizza franchise information action, a view nutritional information action, etc.). Accordingly, one or more actions supported for the pizza entity associated with the user intent may be selected for inclusion within the action-provider list.

A provider description data structure comprising one or more provider entries may be maintained. A provider entry may define a set of entities and/or a set of actions supported by a provider. Accordingly, one or more providers capable of performing one or more actions for the pizza entity may be selected for inclusion within the action-provider list (e.g., a nutrition application, a pizza company website, a phone number dial command to a pizza shop, etc.). In this way, the action-provider list comprising one or more providers configured to perform actions on the entity may be provided to the user to facilitate completion of the user task, at 208.

A user selection within the action-provider list may be received. The user selection may comprise a provider and/or an action supported by the provider. A context comprising the entity, the action, and/or personalization data (e.g., a location, preference, history, social network data, login credentials, etc.) may be sent to the provider so that the provider may have information available to efficiently process the user task, while mitigating reentry of information by the user. At 210, the method ends.

Figure 3:
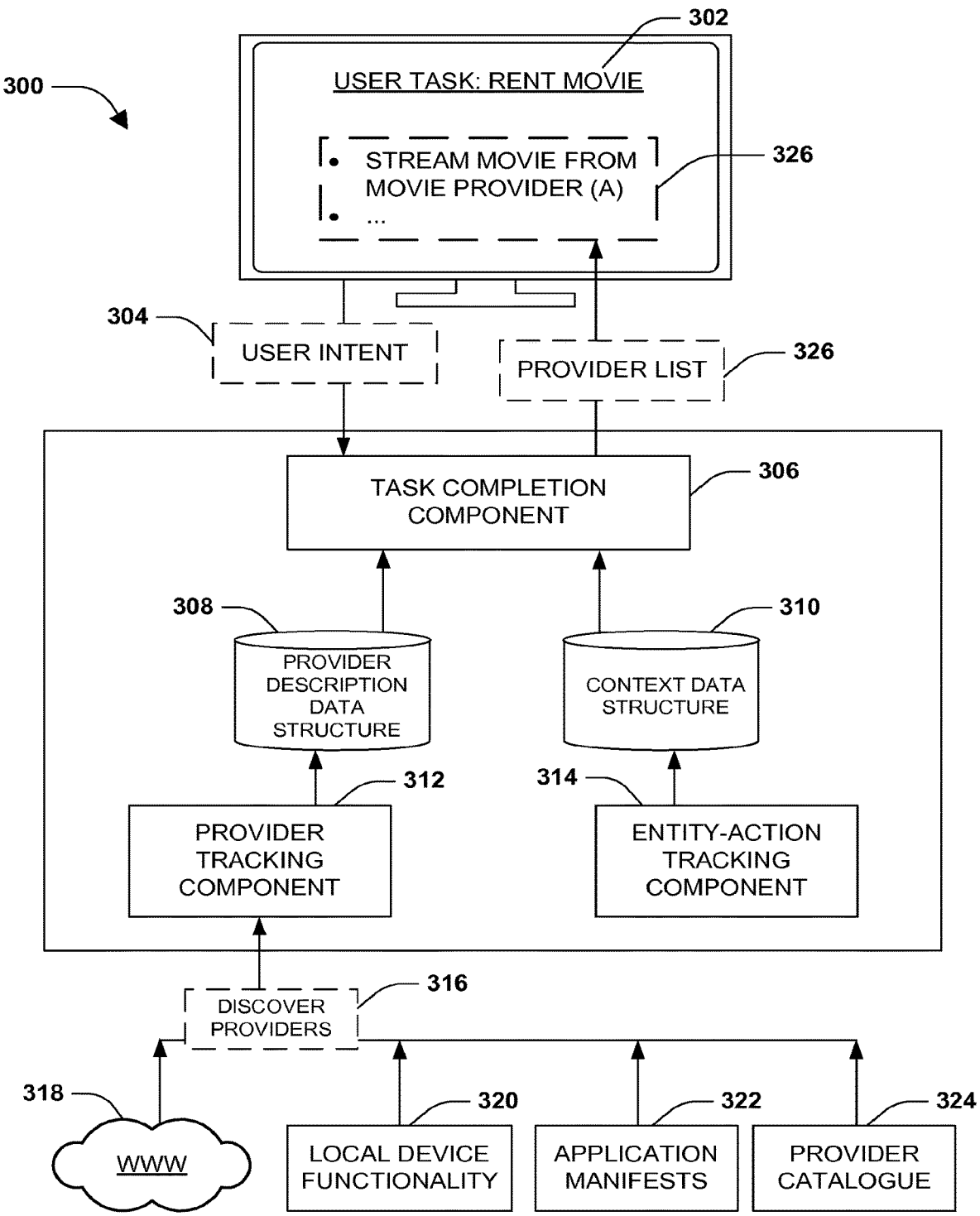
FIG. 3 is a component block diagram illustrating an exemplary system for facilitating completion of a user task.

FIG. 3 illustrates an example of a system 300 configured for facilitating completion of a user task 302. The system 300 may comprise a task completion component 306, a provider tracking component 312, and/or an entity-action tracking component 314. The provider tracking component 312 may be configured to facilitate an open market for providers, such that available/registered providers may be dynamically selected and/or provided to users to complete user tasks. In one example, the provider tracking component 312 may be configured to maintain a provider description data structure 308. The provider tracking component 312 may allow providers to register, unregister, and/or update registration with the provider description data structure 308 (e.g., a provider entry within the provider description data structure 308 may define entities and/or actions supported by a provider). In this way, the provider description data structure 308 may dynamically change over time as new providers register, old providers unregister, etc.

The provider tracking component 312 may be configured to discover 316 providers (e.g., actively discover providers; passively receive registration requests and/or application manifests from providers; etc.). In one example, the provider tracking component 312 may discover 316 new providers based upon a web crawl 318. In another example, the provider tracking component 312 may discover 316 new providers based upon local device functionality 320 (e.g., a new movie streaming application may be installed on a user device). In another example, the provider tracking component 312 may discover 316 new providers based upon an application manifest 322 submitted by a developer of a provider (e.g., the application manifest 322 may define entities and/or actions supported by the provider). In another example, the provider tracking component 312 may discover 316 new providers based upon a provider catalogue 324 identifying various providers capable of completing user tasks (e.g., an application store and/or a provider repository may maintain a list of active and/or available providers). In this way, one or more providers within the provider description data structure 308 may be suggested to the user for completion of the user task 302.

The entity-action tracking component 314 may be configured to maintain a context data structure 310. The context data structure 310 may comprise one or more entity entries. An entity entry may define an entity (e.g., a movie entity) and/or one or more actions supported for the entity (e.g., a rent movie action, a stream movie action, a preview movie action, etc.). In this way, one or more actions, defined within the context data structure 310, may be suggested to the user for completion of the user task 302. In one example, the entity-action tracking component 314 may maintain unique IDs for entities. The entity-action tracking component 314 may be configured to identify a description of an entity within an entity storage structure (e.g., an entity graph) based upon a unique ID for the entity. In this way, the context data structure 310 may be generated at runtime (e.g., in real-time, on-the-fly, etc.) based upon the entity storage structure.

The task completion component 306 may be configured to identify a user intent 304 associated with the user task 302. The user intent 304 may comprise an entity (e.g., a movie entity) and/or an action (e.g., a rent movie action). The task completion component 306 may be configured to create a provider list 326 comprising one or more providers configured to perform the action on the entity. In one example, the task completion component 306 may consult the provider description data structure 308 to identify the one or more providers for inclusion within the provider list 326. In one example, the task completion component 306 may consult the context data structure 310 to obtain information associated with the entity (e.g., a description/meaning of the movie entity, one or more actions supported for the movie entity, etc.). In this way, the task completion component 306 may provide the provider list 326 to the user to facilitate completion of the user task 302. It may be appreciated in one example where the user intent 304 merely comprises the entity, the task completion component 306 may identify one or more actions supported for the entity and/or may provide an action-provider list (e.g., an action-provider list comprising one or more actions supported for the entity and/or one or more providers capable of performing actions on the entity) to the user to facilitate completion of the user task 302.

The task completion component 306 may be configured to receive a user selection within the provider list 326 (e.g., and/or the action-provider list). The user selection may comprise a provider and/or an action supported by the provider. The task completion component 306 may send a context comprising the entity, the action, and/or personalization data (e.g., a location, preference, history, social network data, login credentials, etc.) to the provider so that the provider may have information available to efficiently process the user task 302, while mitigating reentry of information by the user. In one example, the task completion component 306 may be configured to send the context along (e.g., concurrently) with the provider list 326 (e.g., and/or the action provider list). In this way, the context may be sent to the provider by a user interface hosting the provider list 326 (e.g., and/or the action provider list).

Figure 4:
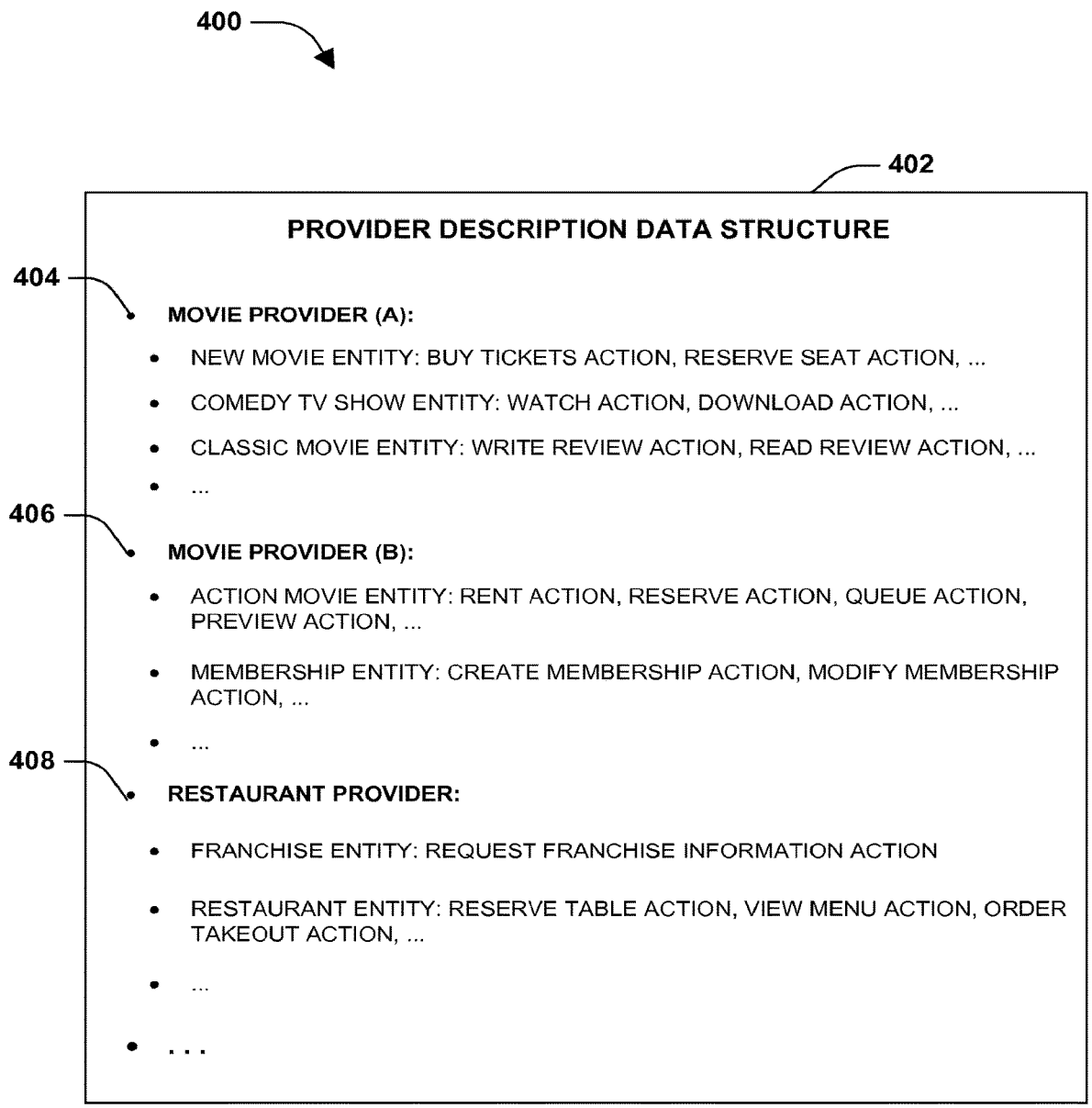
FIG. 4 is an illustration of a provider description data structure.

FIG. 4 illustrates an example 400 of a provider description data structure 402. The provider description data structure 402 may comprise one or more provider entries. In one example, a provider entry may correspond to a registration of a provider with an open market of providers for completing user tasks. The provider entry may define a set of entities and/or a set of actions supported by the provider. For example, a restaurant provider entry 408 may define a set of entities (e.g., a franchise entity, a restaurant entity, etc.) and/or a set of actions (e.g., a request franchise information action, a view menu action, an order takeout action, a reserve table action, etc.) supported by a restaurant provider application. In one example, the provider description data structure 402 may be implemented as an index (e.g., comprising entity/action pairs for respective entities, providers corresponding to respective entity/action pairs, etc.), where an entity may be used as the main pivot for the index, for example. A list of actions may, for example, be maintained for respective entities within the index (e.g., creating entity/action pairs representing one or more actions supported for an entity). For respective entity/action pairs, one or more corresponding providers may be defined (e.g., a provider configured to perform an action upon an entity represented by an entity/action pair).

Various techniques may be employed to identify and/or register providers with the provider description data structure 402. In one example, a web crawl may be performed to discover a movie provider (A). Various entities and/or actions supported by the movie provider (A) may be identified. For example, the movie provider (A) may be capable of performing actions upon a new movie entity for a movie showing in theatres (e.g., a buy tickets action, a reserve seat action, etc.), a comedy TV show entity (e.g., a watch action, a download action, etc.), a classic movie entity, such as Casablanca, Gone with the Wind, etc. (e.g., a write review action, a read review action, etc.), and/or other entities. In this way, a movie provider (A) entry 404 may be created within the provider description data structure 402. In another example, a movie provider (B) may submit a provider registration request to become registered within the open market of providers. The provider registration may specify one or more entities (e.g., an action movie entity, a membership entity, etc.) and/or actions (e.g., a rent action, a reserve action, a queue action, a preview action, a create membership action, a modify membership action, etc.) supported by the movie provider (B). In this way, a movie provider (B) entry 406 may be created within the provider description data structure 402. Provider entries may be added, removed, and/or updated (e.g., a ranking for a provider may be updated based upon user feedback) within the provider description data structure 402. Provider entries within the provider description data structure 402 may be used to create dynamic provider lists and/or action-provider lists that may be provided to users to facilitate completion of user tasks.

Figure 5:
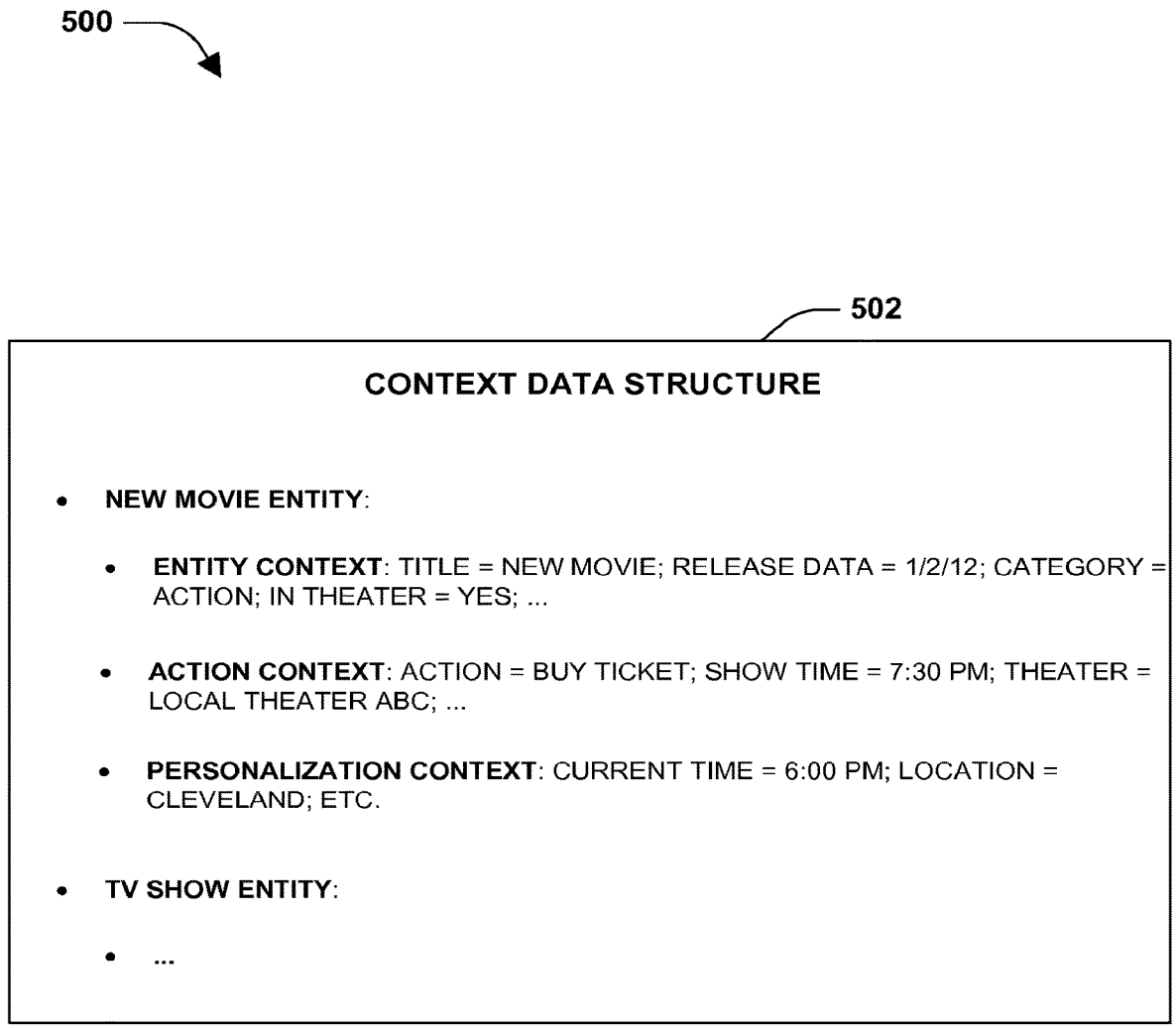
FIG. 5 is an illustration of an example of a context data structure.

FIG. 5 illustrates an example 500 of a context data structure 502. The context data structure 502 may comprise one or more entity entries. An entity entry may define an entity and/or one or more actions supported for the entity. In one example, the context data structure 502 may comprise a new movie entity entry defining a new movie (e.g., a recently released action movie playing in theaters). For example, the new movie entity entry may comprise an entity context specifying a title, a release date, a category, and/or other information for the new movie entity, such as whether the new movie is in theaters. The new movie entity entry may comprise an action context defining an action for the new movie entity. For example, an action context may define a buy ticket action for a showing of the action movie in local theatre ABC at 7:30 PM. The new movie entity entry may comprise a personalization context. The personalization context may identify information associated with the user (e.g., a current time, a location, etc.). In one example, the context data structure 502 may be created at runtime (e.g., during processing of user intent to create a provider list and/or an action-provider list). For example, the context data structure 502 may be created using one or more descriptions of entities defined within an entity storage structure (e.g., an entity graph).

Entity entries within the context data structure 502 may be used to create dynamic provider lists and/or action-provider lists that may be provided to users to facilitate completion of user tasks. For example, a user may search for the action movie (e.g., a user intent for a user task may comprise the new movie entity). The context data structure 502 may be queried with the new movie entity to identify one or more actions supported for the new movie entity (e.g., a buy ticket action). The one or more actions may be selected for inclusion within an action-provider list that may be provided to the user to facilitate completion of the user task.

Figure 6:
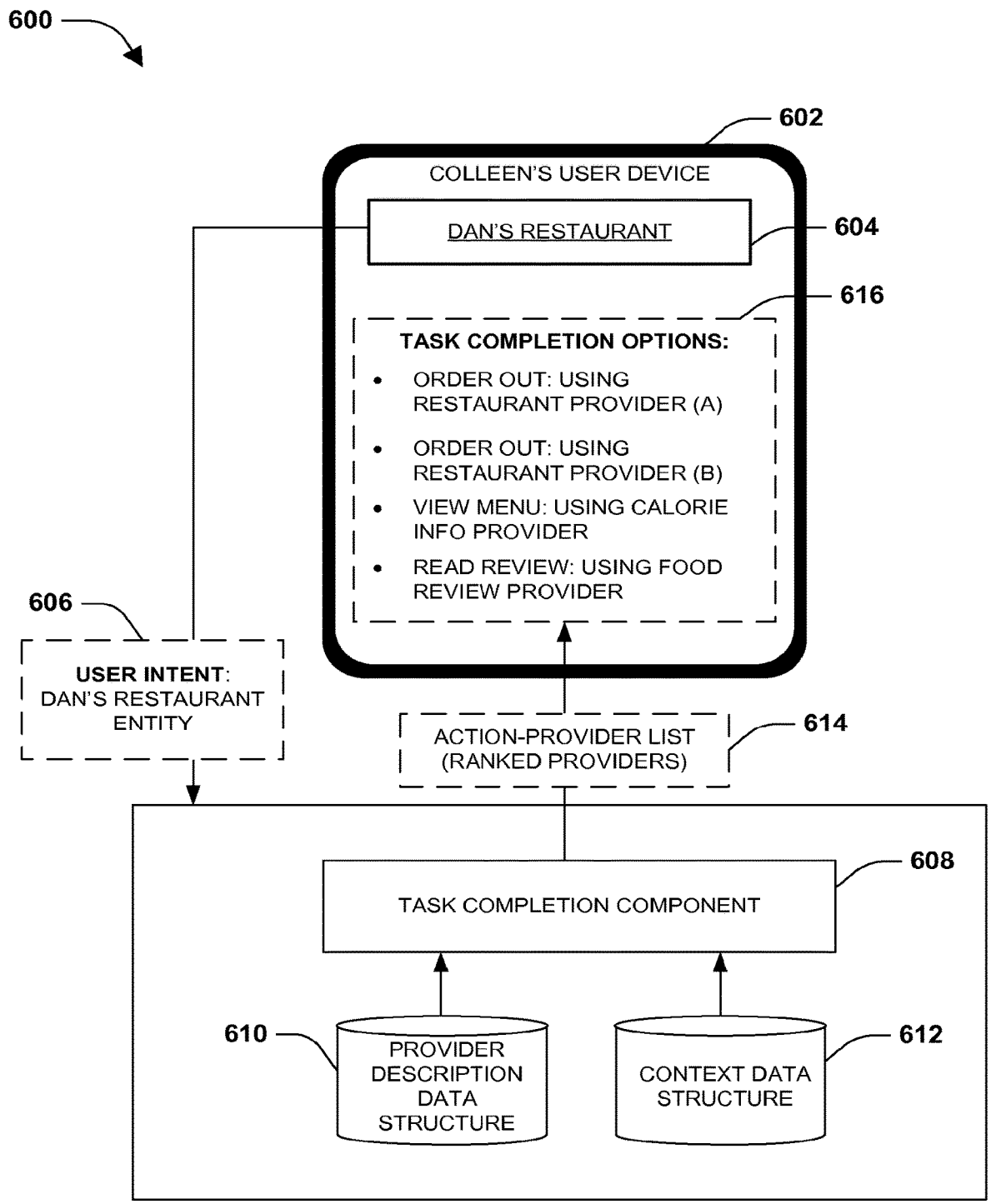
FIG. 6 is an illustration of an example of a task completion component providing an action-provider list to a user.

FIG. 6 illustrates an example 600 of a task completion component 608 providing an action-provider list 614 to a user. A user (e.g., Colleen) may utilize a mobile computing device (e.g., Colleen's user device 602) to perform a user task. For example, Colleen may input Dan's Restaurant 604 into a personal assistant application on Colleen's user device 602 in an attempt to read a review about Dan's Restaurant. The task completion component 608 may identify a user intent 606 associated with Colleen's interaction with the personal assistant application. The user intent 606 may comprise a Dan's Restaurant entity. The task completion component 608 may query a context data structure 612 using the Dan's Restaurant entity to identify one or more actions supported for the Dan's Restaurant entity. For example, an order out action, a view menu action, a read review action, and/or other actions may be supported for the Dan's Restaurant entity.

The task completion component 608 may query a provider description data structure 610 to identify one or more providers capable of performing actions upon the Dan's Restaurant entity. For example, a restaurant provider (A) may support the order action, a restaurant provider (B) may support the order action, a calorie info provider may support the view menu action, a food review provider may support the read review action. One or more ranked providers (e.g., providers having desirable rankings, such as rankings above a threshold rank; a number N highest ranked providers; etc.) may be included within the action provider list 614. The action-provider list 614 may be presented as task completion options 616. In this way, Colleen may select a provider (e.g., the food review provider) to perform an action (e.g., the read review action) upon the entity (e.g., Dan's Restaurant entity) to complete the user task.

Figure 7:
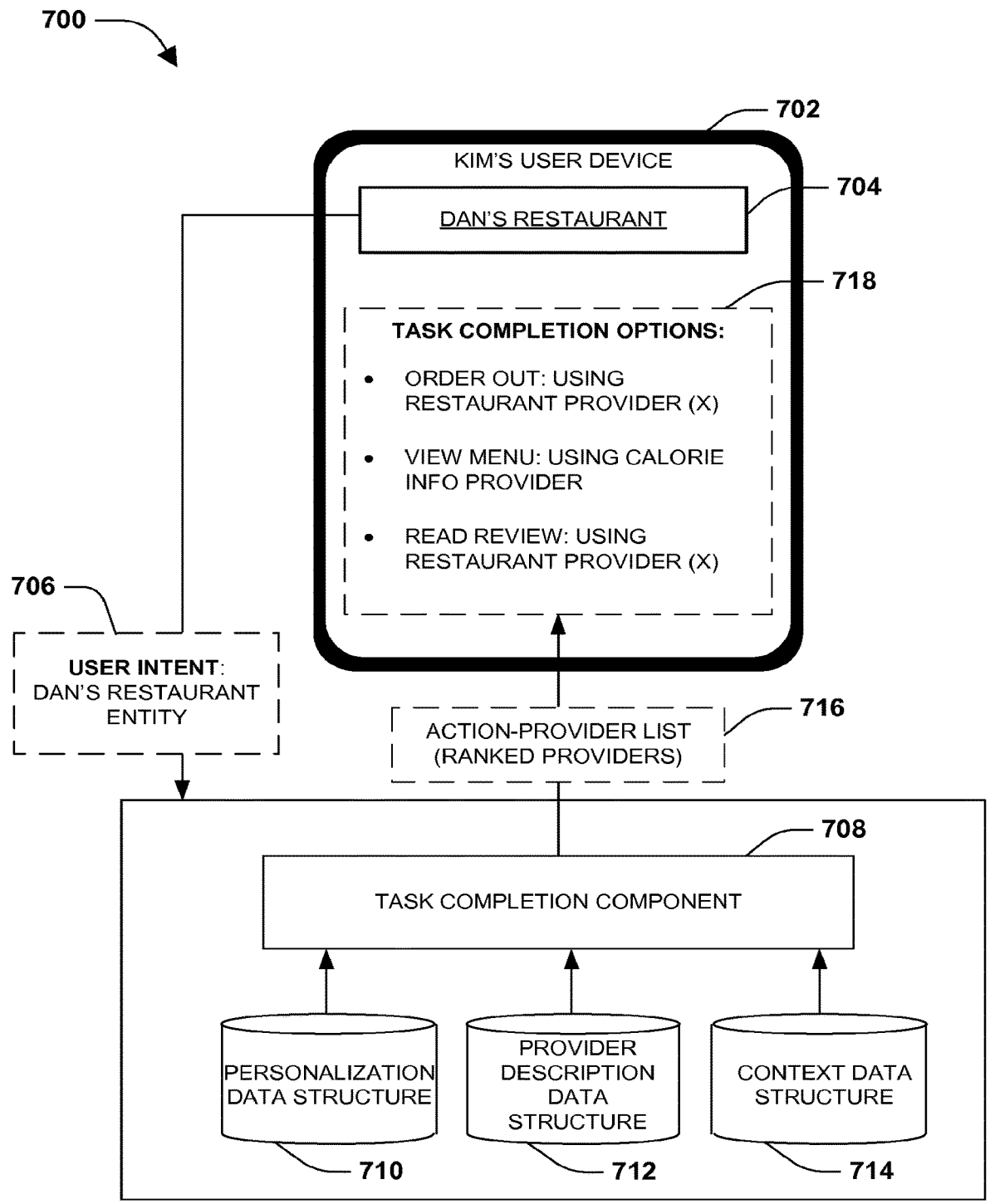
FIG. 7 is an illustration of an example of a task completion component providing an action-provider list to a user.

FIG. 7 illustrates an example 700 of a task completion component 708 providing an action-provider list 716 to a user. A user (e.g., Kim) may utilize a mobile computing device (e.g., Kim's user device 702) to perform a user task. For example, Kim may input Dan's Restaurant 704 into a personal assistant application on Kim's user device 702 in an attempt to view a menu for Dan's Restaurant. The task completion component 708 may identify a user intent 706 associated with Kim's interaction with the personal assistant application. The user intent 706 may comprise a Dan's Restaurant entity. The task completion component 708 may query a context data structure 714 using the Dan's Restaurant entity to identify one or more actions supported for the Dan's Restaurant entity. For example, an order out action, a view menu action, a read review action, and/or other actions may be supported for the Dan's Restaurant entity.

The task completion component 708 may query a provider description data structure 712 to identify one or more providers capable of performing actions upon the Dan's Restaurant entity. For example, a restaurant provider (X) may support the order action, a calorie info provider may support the view menu action, the restaurant provider (X) may support the read review action, and a restaurant provider (Y) may support the order out action. It may be appreciated that in one example, action-provider lists may be dynamically created, which may result in varying providers being selected for action-provider lists (e.g., action-provider list 716 may be different than action provider list 614 of FIG. 6 for Dan's Restaurant entity) based upon provider information within the provider description data structure, such as updated provider entries (e.g., restaurant provider (A) may now have an undesirable rank based upon user feedback), new provider entries (e.g., restaurant provider (Y) may have recently registered to become available to complete user tasks), removed provider entries (e.g., restaurant provider (B) may be unavailable to complete user tasks), etc. In this way, one or more ranked providers may be included within the action provider list 716.

The task completion component 708 may a query personalization data structure 710 comprising user (provided) preference data to further refine the action-provider list 716. For example, Kim may have an account with restaurant provider (X) based upon prior takeout orders. Accordingly, restaurant provider (X) may be included within the action-provider list 716 for the read review action and the order out action (e.g., in lieu of restaurant provider (Y) for the order out action). The action-provider list 716 may be presented as task completion options 718. In this way, Kim may select a provider (e.g., calorie info provider) to perform an action (e.g., the view menu action) upon the entity (e.g., Dan's Restaurant entity) to complete the user task. It may be appreciated that action-provider list 716 may be different than action provider list 614 of FIG. 6 for Dan's Restaurant entity regardless of and/or even in the absence of a user preference data (e.g., from a personalization data structure). That is, since action-provider lists may be dynamically created, they may differ from time to time (e.g., even for the same person) and/or from person to person (e.g., even at the same time).

Figure 8:
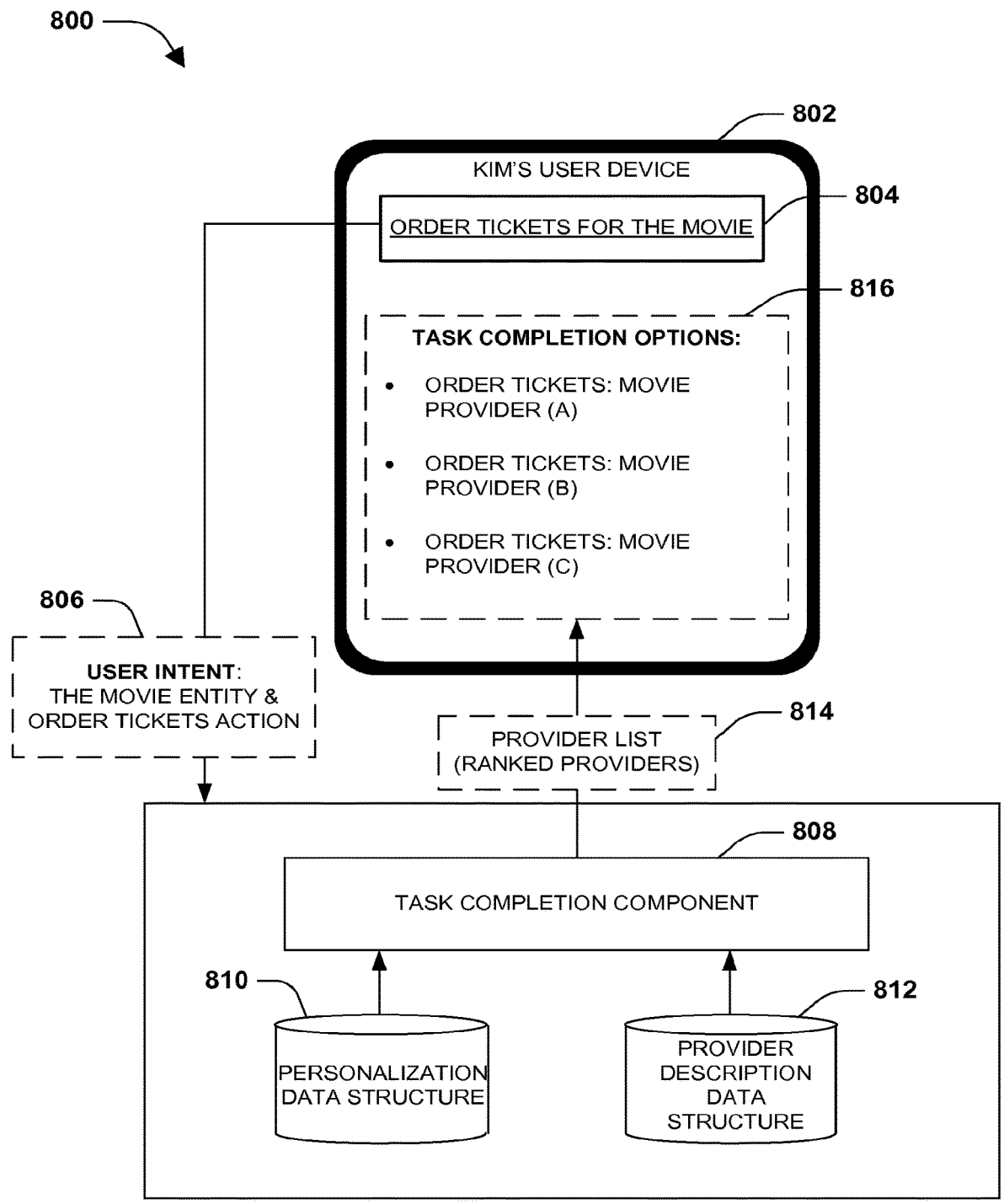
FIG. 8 is an illustration of an example of a task completion component providing a provider list to a user.

FIG. 8 illustrates an example 800 of a task completion component 808 providing a provider list 814 to a user. A user (e.g., Kim) may utilize a mobile computing device (e.g., Kim's user device 802) to perform a user task. For example, Kim may submit a search query, order tickets for the movie 804, into a web search engine on Kim's user device 802 in an attempt to purchase movie tickets for the movie. The task completion component 808 may identify a user intent 806 associated with Kim's interaction with the web search engine. The user intent 806 may comprise a movie entity and/or an order tickets action.

The task completion component 808 may query a provider description data structure 812 to identify one or more providers capable of performing the order tickets action on the movie entity associated with the user intent 806. For example, a movie provider (A), a movie provider (B), a movie provider (C), a movie provider (D), and/or movie provider (E) may be dynamically selected for inclusion within the provider list 814. In one example, the provider list 814 may be refined (e.g., a new provider may be added, a provider may be removed, providers may be reordered, etc.) based upon rankings of such providers. For example, movie provider (A), movie provider (B), and movie provider (C) may have desirable rankings, and thus may be included within the provider list 814 (e.g., movie provider (D) and movie provider (E) may have undesirable rankings, and thus may be excluded). In another example, the provider list 814 may be refined based upon a personalization data structure 810 indicating that Kim has provided positive feedback for movie provider (A), such that movie provider (A) may be ordered first within the provider list 814. The provider list 814 may be presented as task completion options 816. In this way, Kim may select a provider (e.g., the movie provider (A)) to perform the order tickets action upon the movie entity to complete the user task.

Figure 9:
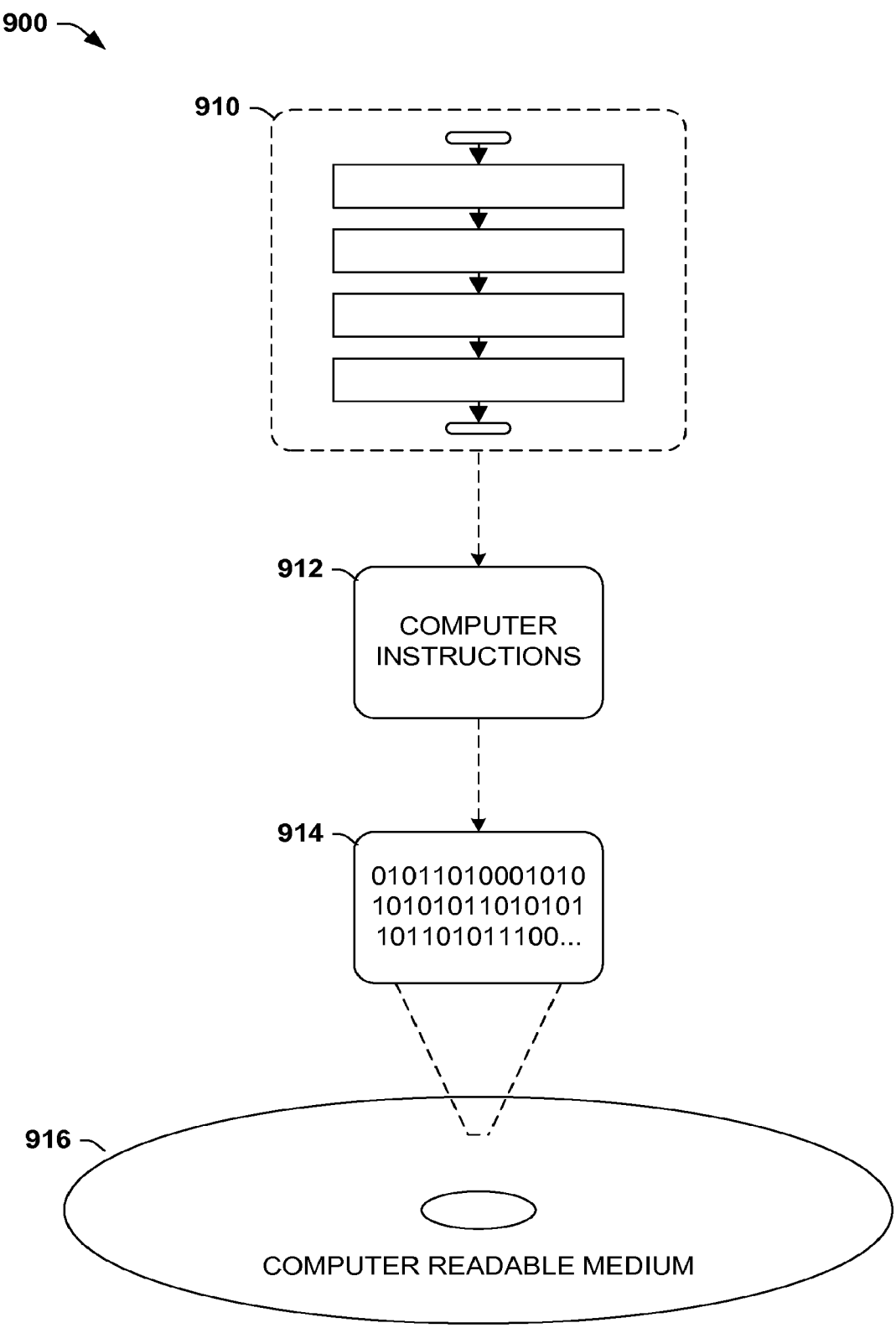
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable computer instructions 912 may be configured to perform a method 910, such as at least some of the exemplary method 100 of FIG. 1 and/or at least some of exemplary method 200 of FIG. 2, for example. In another such embodiment, the processor-executable instructions 912 may be configured to implement a system, such as at least some of the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
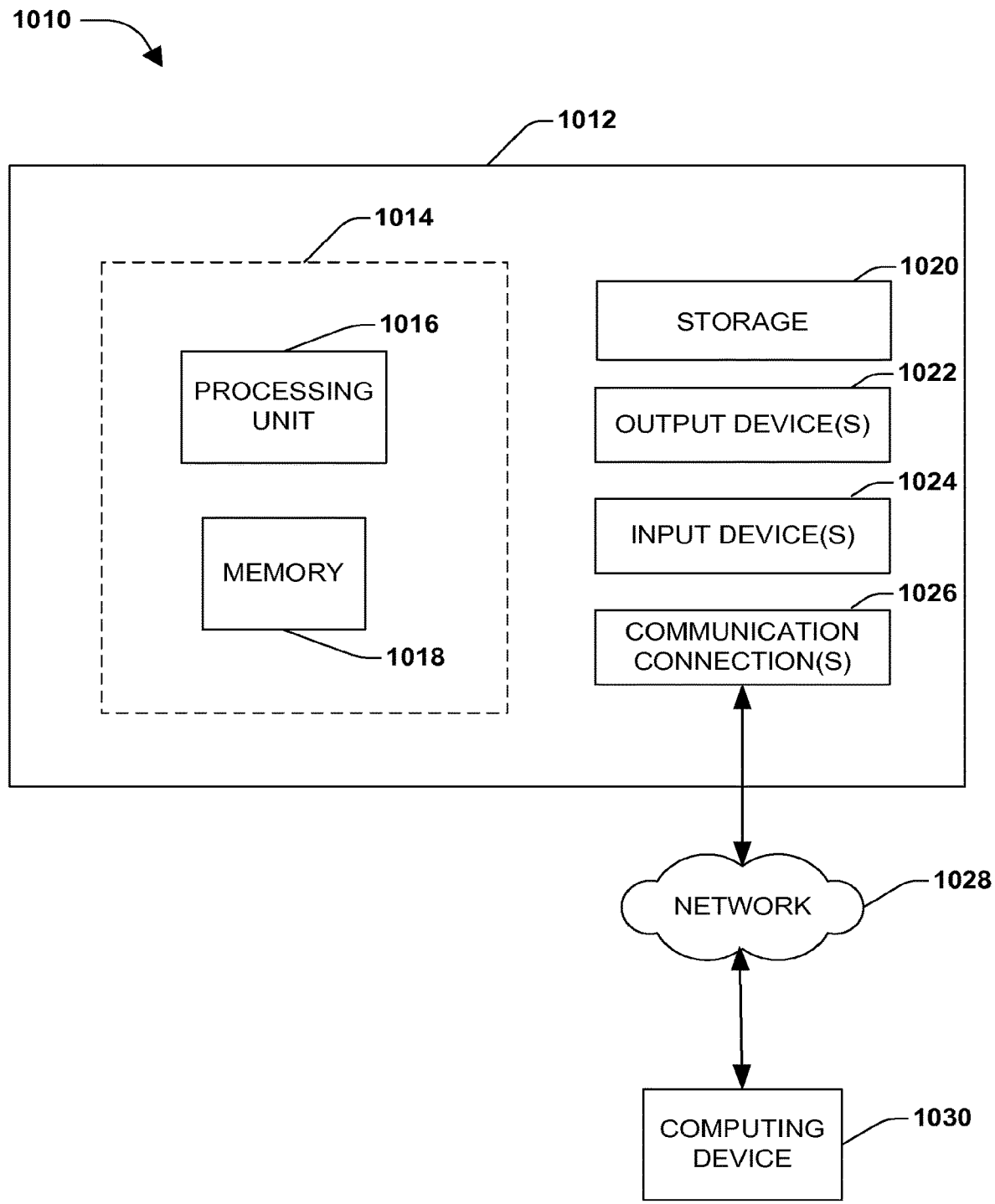
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-implemented method for facilitating completion of a first task, the method comprising:
  receiving a query from a user using a personal assistant application on a mobile device;
  identifying the first task from the query, wherein the first task is associated with an entity and an action that is to be performed on the entity;
  identifying a context data structure comprising an entry defining the entity and one or more actions supported for the entity;
  dynamically ranking one or more potential providers configured to perform the action on the entity, wherein the dynamic ranking changes in response to a change in the context data structure;
  based on the context data structure, creating a provider list comprising one or more providers configured to perform the action on the entity, wherein creating the provider list comprises selecting, from a provider description data structure, a provider for inclusion within the provider list, an indication that the provider is configured to perform the first action on the entity, and the dynamic ranking of the provider based upon the user's interaction with the personal assistant application, wherein the provider description data structure comprises an entry defining the provider, the entity, and the action; and providing the provider list to the user to facilitate completion of the first task.

2. The method of claim 1, wherein the provider corresponds to at least one of a website, a web service, a command on a user device, a native application on the user device, or a remote application.

3. The method of claim 1, comprising:

maintaining a provider description data structure comprising one or more provider entries, a provider entry defining a set of entities and a set of actions supported by a provider.

4. The method of claim 3, comprising:

identifying a provider within the provider description data structure for inclusion within the provider list based upon the provider supporting the action and the entity.

5. The method of claim 3, comprising:

discovering one or more new providers for inclusion within the provider description data structure based upon at least one of a web crawl, an application manifest, local device application functionality, or a direct feed.

6. The method of claim 3, comprising:

receiving a provider registration from the provider, the provider registration specifying at least one of a set of supported entities and a set of supported actions supported by the provider; and creating a new provider entry within the provider description data structure based upon the provider registration.

7. The method of claim 1, comprising:

maintaining a context data structure comprising one or more entity entries, an entity entry defining the entity and one or more actions supported for the entity.

8. The method of claim 1, comprising:

maintaining a personalization data structure comprising user provider preference data.

9. The method of claim 8, wherein creating the provider list further comprises selecting, from the personalization data structure, one or more providers configured to perform the first action on the entity.

10. The method of claim 8, wherein the ranking of the provider is based on at least one of provider popularity, provider security features, or experience feedback.

11. The method of claim 1, the creating a provider list comprising:

creating the provider list at runtime.

12. The method of claim 1, comprising:

receiving a user selection of the provider within the provider list; and sending a context comprising the entity and the action to the provider.

13. The method of claim 1, comprising:

identifying a second user intent associated with a second task of a second user, the second user intent comprising the entity and the action that is to be performed on the entity;

creating a second provider list comprising one or more providers configured to perform the action on the entity, the second provider list different than the first provider list; and providing the second provider list to the second user to facilitate completion of the second task.

14. The method of claim 1, wherein identifying the task comprises identifying a user intent of the user, the user intent representing the entity and the action to be performed.

15. A computer-implemented method for facilitating completion of a user task, comprising:

receiving a query from a user using a personal assistant application on a mobile device;

identifying the user task from the query, wherein the user task is associated with a user task of a user, the user intent comprising an entity;

identifying a context data structure comprising an entry defining the entity and one or more actions supported for the entity;

based on the context data structure, creating an action-provider list comprising one or more providers configured to perform one or more actions on the entity, wherein creating the provider list comprises selecting, from a provider description data structure, a provider for inclusion within the provider list, an indication that the provider is configured to perform the first action on the entity, and a dynamic ranking of the provider based upon the user's interaction with the personal assistant application, wherein the provider description data structure comprises an entry defining the provider, the entity, and the action;

upon a change to context data structure, modifying the dynamic ranking of one or more of the providers in the action-provider list; and providing the action-provider list to the user to facilitate completion of the user task.

16. The method of claim 15, comprising:

receiving a user selection, within the action-provider list, of the provider and an action supported by the provider; and sending a context comprising the entity and the action to the provider.

17. A system:

at least one processor;

memory coupled to the at least one processor; and a task completion component configured to:

receive a query from a user using a personal assistant application on a mobile device;

identify the user task from the query, wherein the user task is associated with a user task of an entity and an action that is to be performed on the entity;

based on the context data structure, create a provider list comprising one or more providers configured to perform the action on the entity, wherein creating the provider list comprises selecting, from a provider description data structure, a provider for inclusion within the provider list, an indication that the provider is configured to perform the first action on the entity, and a dynamic ranking of the provider based upon the user's interaction with the personal assistant application, wherein the provider description data structure comprises an entry defining the provider, the entity, and the action;

when a change to context data structure occurs, modify the dynamic ranking of one or more of the providers in the provider list; and provide the provider list to the user to facilitate completion of the user task.

18. The system of claim 17, comprising:

a provider tracking component configured to:

maintain a provider description data structure comprising one or more provider entries, a provider entry defining a set of entities and a set of actions supported by the provider.

19. The system of claim 17, comprising:
an entity-action tracking component configured to:
    maintain a context data structure comprising one or more entity entries, an entity entry defining the entity and one or more actions supported for the entity.

* * * * *